(12) United States Patent
Ahn et al.

(10) Patent No.: US 7,379,741 B2
(45) Date of Patent: May 27, 2008

(54) SUB-CARRIER ALLOCATION METHOD FOR REDUCING INTER-CELL INTERFERENCE IN OFDM CELLULAR ENVIRONMENT

(75) Inventors: Joon-Kui Ahn, Seoul (KR); Dong-Wook Roh, Seoul (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 10/877,996

(22) Filed: Jun. 29, 2004

(65) Prior Publication Data
US 2005/0047259 A1 Mar. 3, 2005

(30) Foreign Application Priority Data
Aug. 18, 2003 (KR) ...................... 10-2003-0056951

(51) Int. Cl.
*H04Q 7/20* (2006.01)
(52) U.S. Cl. ................... 455/450; 455/114.2; 455/272; 455/278.1; 455/296; 455/561; 455/562.1; 370/208; 370/329; 370/339; 370/341
(58) Field of Classification Search ................ 455/450, 455/562.1, 561, 63.1, 114.2, 272, 278.1, 296; 370/208, 329, 339, 341
See application file for complete search history.

(56) References Cited

U.S. PATENT DOCUMENTS

| 6,160,791 | A | * | 12/2000 | Bohnke | 370/208 |
| 6,947,748 | B2 | * | 9/2005 | Li et al. | 455/450 |
| 7,039,441 | B1 | * | 5/2006 | Reudink et al. | 455/562.1 |
| 7,151,740 | B2 | * | 12/2006 | Zhang et al. | 370/208 |
| 2003/0043732 | A1 | * | 3/2003 | Walton et al. | 370/208 |
| 2003/0147655 | A1 | | 8/2003 | Shattil | 398/182 |
| 2004/0127223 | A1 | | 7/2004 | Li et al. | 455/446 |
| 2005/0018782 | A1 | | 1/2005 | Costa et al. | 375/260 |

FOREIGN PATENT DOCUMENTS

WO   WO 03/026193 A1   3/2003

OTHER PUBLICATIONS

International Search Report and Written Opinion dated Nov. 29, 2004.

* cited by examiner

*Primary Examiner*—Steve M. D'Agosta
(74) *Attorney, Agent, or Firm*—Ked & Associates, LLP

(57) ABSTRACT

A sub-carrier allocation method including selecting a number of cells having a strongest inter-cell interference among cells in a multiple-cell environment, and selecting mutually exclusive sub-carrier sets for each cell selected having the strongest interference.

22 Claims, 7 Drawing Sheets

SUB-CARRIER ALLOCATION METHOD FOR REDUCING INTER-CELL INTERFERENCE IN OFDM CELLULAR ENVIRONMENT

BACKGROUND OF THE INVENTION

1. Field of the Invention

The present invention relates to an OFDM (Orthogonal Frequency Division Multiplexing) method, and more particularly to a sub-carrier allocation method for reducing inter-cell interference in an OFDM cellular environment.

2. Background of the Related Art

Current mobile communication standardization technologies include an AMPS (Advanced Mobile Phone system) and WCDMA (Wideband Code Division Multiple Access) system. In these communication systems, multiplexing is used to support multiple users by constructing multiple communication paths (channels) to transmit and receive an independent signal. In more detail, multiplexing divides one line or transmission path in to multiple channels (for a fixed line, a pair of cables, and for a wireless service, a pair of transceivers).

Examples of multiplexing methods include a FDM (Frequency Division Multiplexing) method in which one line is divided into multiple frequency bands and then multiplexed, and a TDM (Time Division Multiplexing) method in which one line is divided into very short time intervals and then multiplexed.

AMPS, which is a first generation analog mobile communication standard, uses FDM. A second generation mobile communication system is called IS-95, and uses a CDM (Code Division Multiplexing) method. A third generation mobile communication system is called WCDMA (Wideband Code Division Multiple Access) and uses a Code Division Multiplexing (CDM) method.

Another type of multiplexing is called the Orthogonal Frequency Division Multiplexing (OFDM). OFDM is based on a principle of multicarrier modulation, which means dividing a data stream into several bit streams (subchannels), each of which has a much lower bit rate than the parent data stream. These substreams are then modulated using frequencies that are orthogonal to each other. Because of their orthogonality, the subcarriers can be very close to each other (or even partly overlapping) in the frequency spectrum without interfering with each other. Further, because the symbol times on these low bit rate channels are long, there is generally no intersymbol interference (ISI). The result is a very spectrum efficient system.

Digital Audio Broadcasting (DAB) and Digital Video Broadcasting (DVB) are based on OFDM. However, OFDM is not used in a cellular communication system including multiple cells.

SUMMARY OF THE INVENTION

Accordingly, one object of the present invention is to at least address the above and other noted objects.

Another object of the present invention is to provide a novel sub-carrier allocation method that reduces inter-cell interference in an OFDM cellular environment.

To achieve at least the above objects in whole or in parts, the present invention provides a novel sub-carrier allocation method including selecting a number of cells having a strongest inter-cell interference among cells in a multiple-cell environment, and selecting mutually exclusive sub-carrier sets for each cell selected having the strongest interference.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

BEST MODE OF THE INVENTION

Referring now to the drawings, wherein like reference numerals designate identical or corresponding parts throughout the several views, the present invention will be described.

Example of methods for reducing inter-cell interference in an OFDM based system include a FH (Frequency Hopping) method and a DCA (Dynamic Channel Allocation) method. In the FH method, the (transmission) order of sub-carriers is arbitrarily changed according to time in a cell. To reduce inter-cell interference, the order of change of sub-carriers is selected not to overlap in a cell with sub-carries in a strongest cell. To accomplish this, the FH method reserves several sub-carriers (i.e., does not use all of the available sub-carriers). Thus, the FH method is not applicable to be used in a cellular environment including multiple cells, but rather is used only in a single cell environment.

In the DCA method, a strength of an Signal to Interference Noise Ratio (SINR) of each sub-carrier of each user is reported in one cell and a signal is transmitted using sub-carriers having a highest SINR, namely, a good channel state, to thereby reduce data transmission power and interference. However, in the DCA method, a feedback signal is required to inform the base station about the SINR from each terminal (user). This feedback process is very complicated and produces more interference.

Figure 1:
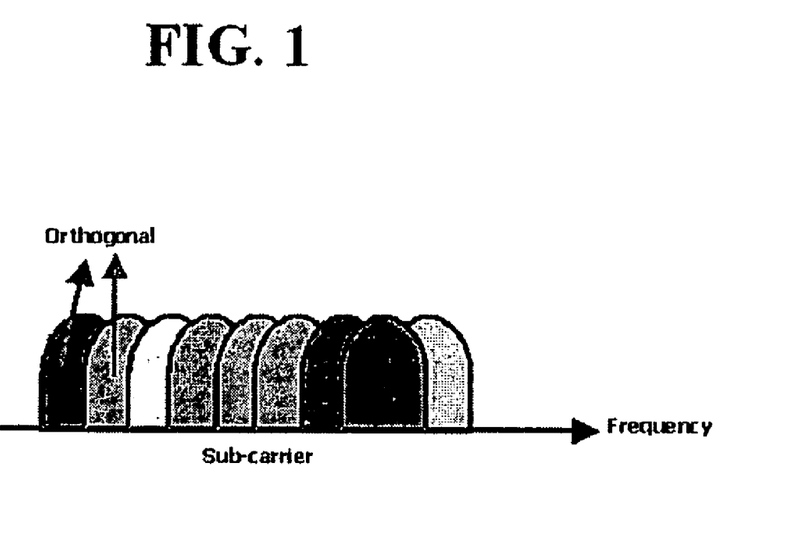
FIG. 1 is an overview illustrating sub-carriers used in OFDM.

Turning now to FIG. 1, which illustrates sub-carriers applied in the OFDM method. As shown, the multiple sub-carriers are in a mutually orthogonal relation and thus do not affect each other even if frequency components of the sub-carriers overlap with each other. Further, because the sub-carries can overlap with each other, more sub-carriers can be multiplexed. In addition, OFDM advantageously allows serially/parallelly converted coding data to be allocated to each sub-carrier and digital-modulated. Thus, the generation of many sub-carriers improves a transmission speed per bandwidth.

Figure 2:
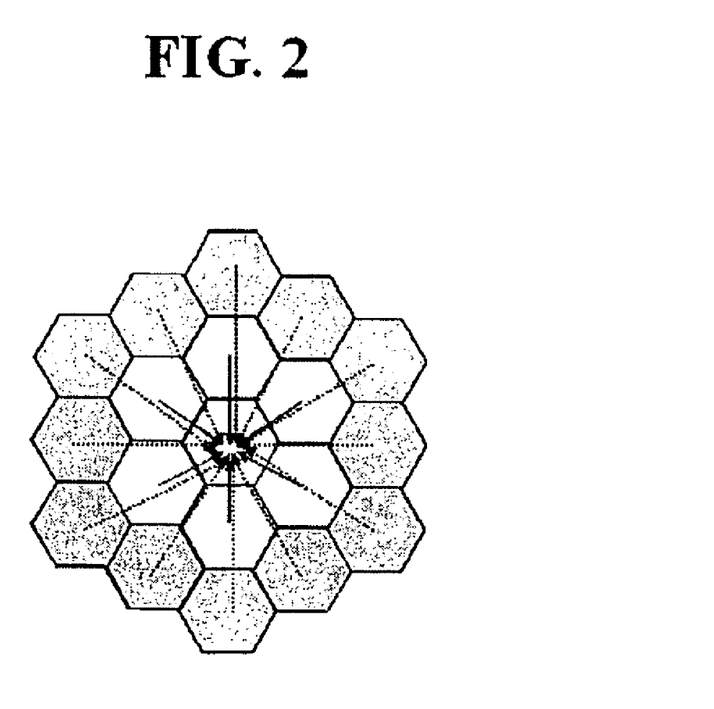
FIG. 2 is an overview illustrating a multi-cell structure in a mobile communication environment.

Turning next to FIG. 2, which illustrates a multi-cell environment. In this environment, the OFDM transmission method is applied in each cell and the same frequency band is allocated to each cell. Further, a terminal located in the central cell is interfered by neighboring cells. In FIG. 2, the six cells in contact with the central cell are called a first ring of cells, and the twelve cells surrounding the first ring is called a second ring of cells. Thus, in this example, a terminal operating in the central cell is interfered by the six cells of the first ring and the twelve cells of the second ring.

Further, the interference caused by first ring of cells is larger than the interference caused by the second ring of cells, because a strength of propagation is reduced the farther away a cell is from the central cell. The following expression defines the propagation strength:

$$P_{RX} \approx \frac{P_{TX}}{d^n} \quad (1)$$

where $P_{TX}$ and $P_{RX}$ indicate a transmission power and reception power, respectively, and 'd' is a distance between a transmitter and a receiver. The value of 'n' differs depending on a channel model, and is usually n=3 or 4.

Thus, with reference to the above equation, the power transmitted from a cell changes based on distance between the transmitter and receiver. Assuming the transmission power of every cell is uniform as P, 'n'=4 and a distance between centers of cells is 'd', the strength of interference coming from the cells of the first ring can be expressed by the following equation:

$$P_{ring1} \approx \frac{P}{d^4} \quad (2)$$

Further, the strength of interference coming from the cells of the second ring can be expressed as follows:

$$P_{ring2} \approx \frac{P}{(2d)^4} = \frac{1}{16} \times \frac{P}{d^4} = \frac{1}{16} P_{ring1} \quad (3)$$

Note that with reference to equations (2) and (3), the interference from the second ring of cells is 1/16 of the interference from the first ring of cells. Thus, the first ring of cells produces the greatest amount of inter-cell interference.

The above example only considers the distance between the transmitter and receiver, and does not consider a long-term fading effect such as a log-normal fading effect or a short term fading effect such as Rayleigh or Rician effect, which occurs in an actual mobile communication environment. However, even if the fading effect is considered, the same result exists (i.e., the first ring of cells produce the greatest interference to the central cell). Thus, in this example, the interference cause by the second ring of cells is considered to be negligible. Note that FIG. 3 illustrates the multi-cell environment when only the interference cause by the first ring of cells is considered.

Figure 3:
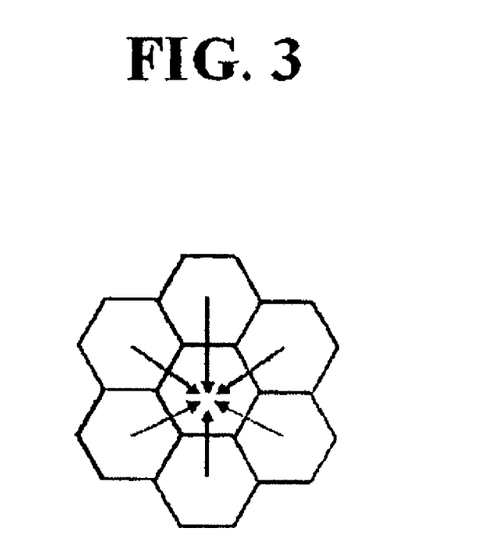
FIG. 3 is an overview illustrating a central target cell and neighboring cells having the strongest interference in a cell structure using an omni-directional antenna.
Figure 4:
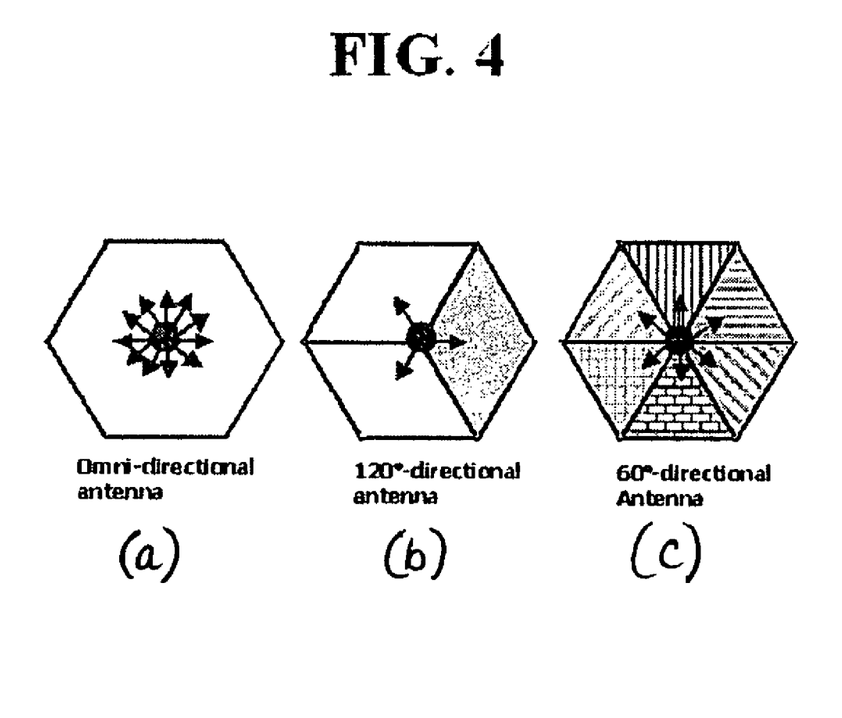
FIGS. 4(a)-(c) are overviews illustrating sector constructions when using an omni-directional antenna and directional antennas.

Further, the cell structure shown in FIGS. 2 and 3 assume an omni-directional antenna is used. However, in other cell arrangements, directional antennas are used. When directional antennas are used, each cell is divided into sectors. Directional antennas include, for example, a 120° directional antenna and a 60° directional antenna. FIGS. 4(a)-(c) illustrates the different cell structures for the omni-directional antenna, a 120° directional antenna and a 60° directional antenna, respectively. As shown, the omni-directional antenna produce one sector, the 120° directional antenna produces three sectors and the 60° directional antenna produces six sectors.

Further, assuming the sectors do not interfere with each other, each sector in one cell can use a single frequency band. Thus, the frequency can be more effectively used. For example, the frequency efficiency is increased three times when using the 120° directional antenna producing three sectors and six times when using the 60° directional antenna producing six sectors.

Figure 5:
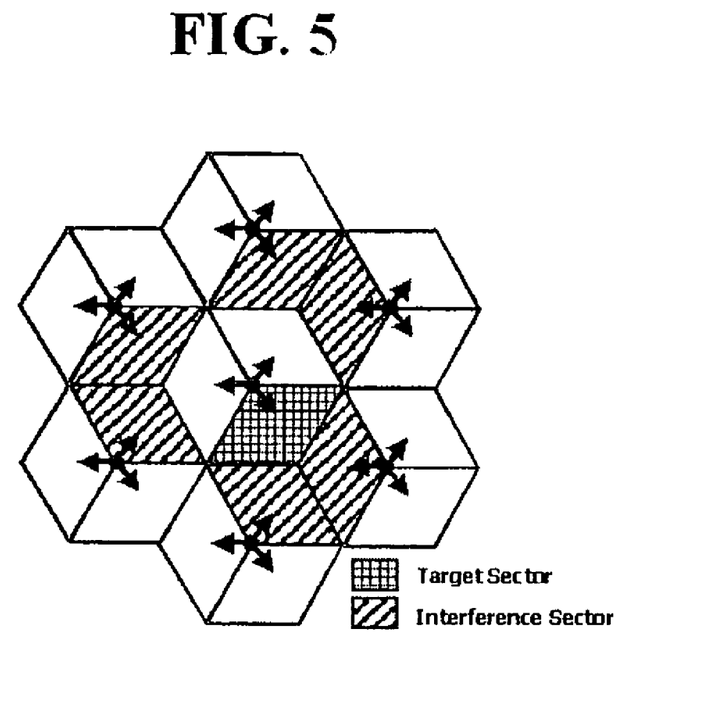
FIG. 5 is an overview illustrating interference among sectors in a 120°-sector structure.

However, sectors in another cell interfere with sectors of a target cell, as shown in FIG. 5, for example (FIG. 5 illustrates the concept of three sectors for a 120° directional antenna). The arrows in FIG. 5 depict centers of the transmission direction of the directional antennas. Further, as shown in FIG. 5, the target sector is assumed to be the lower right lower sector of the central cell and is shaded with checks, and the six sectors in other adjacent cells interfering with the target sector are shaded with slant lines.

Further, the interference at the cell boundary region is problematic, because the transmission power is inversely proportional to the distance as noted above in equation (1). Thus, the reception power (signal strength) from a target cell is very low at the cell boundary region, and therefore a signal at the boundary is easily affected with even with a small amount of interference.

Figure 6:
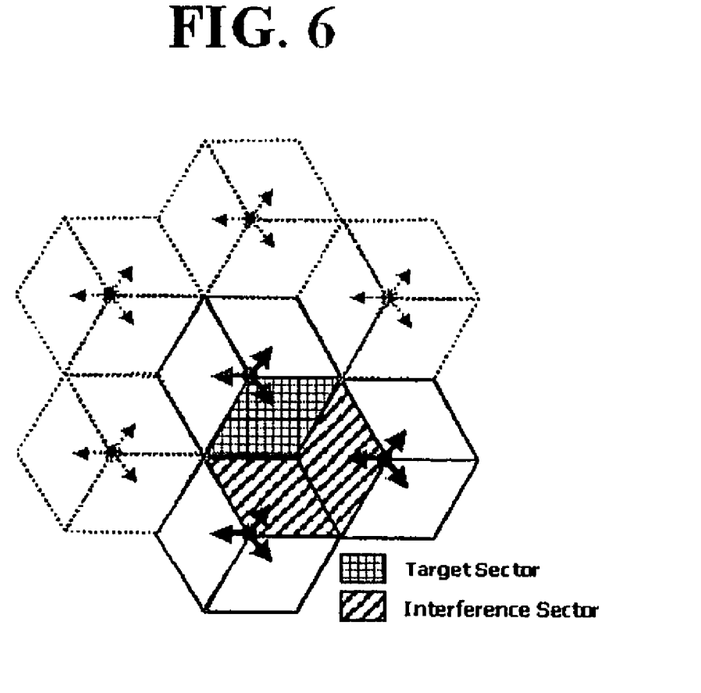
FIG. 6 is an overview illustrating a sector making the strongest interference to the target sector shown in FIG. 5.
Figure 7:
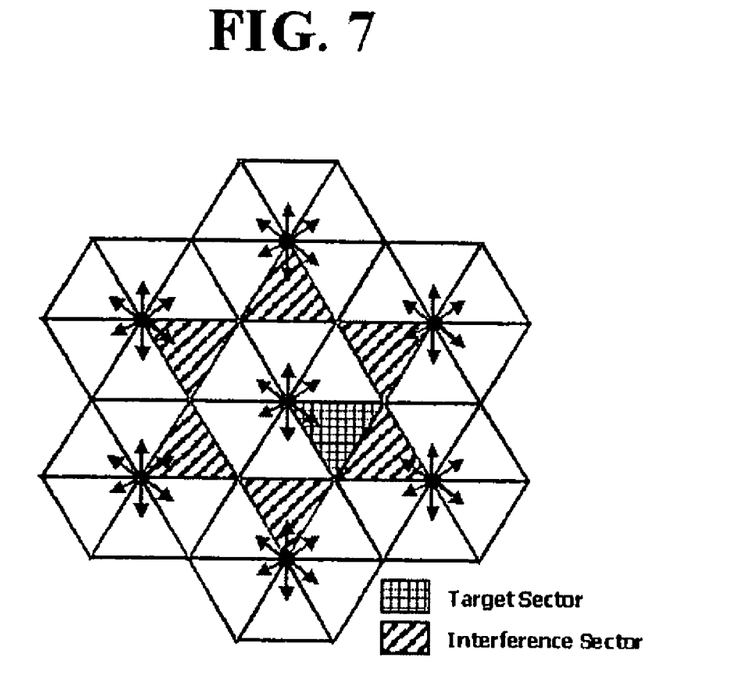
FIG. 7 is an overview illustrating interference among sectors in a 60°-sector structure.
Figure 8:
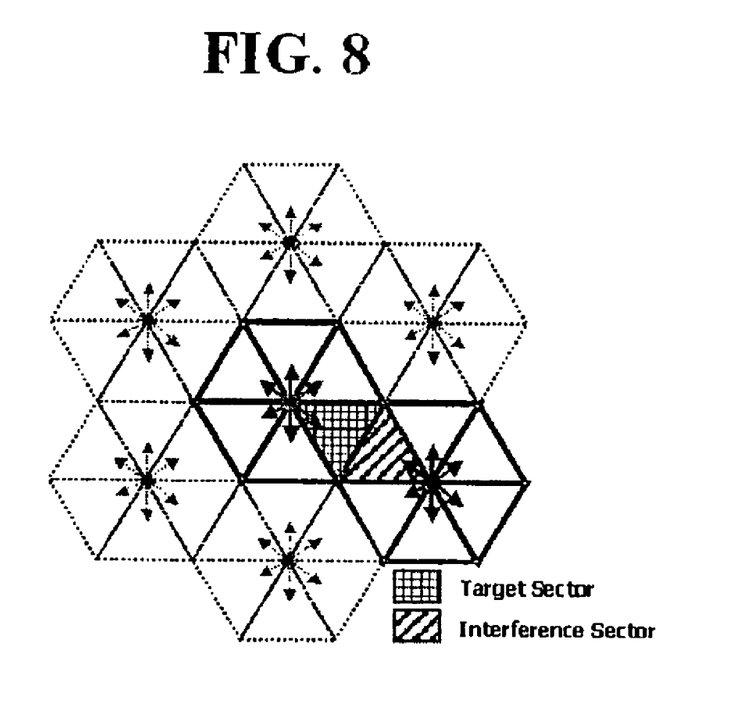
FIG. 8 is an overview illustrating a sector making the strongest interference to the target sector shown in FIG. 7.

Thus, as shown in FIG. 5, for the right lower sector of the central (target) cell, the two sectors nearest to the boundary region of the target sector cause the largest amount of interference to the target sector. FIG. 6 illustrates this concept as well. Similarly, FIGS. 7 and 8 illustrate the interference effect for a target cell when a 60° directional antenna is used.

Figure 9:
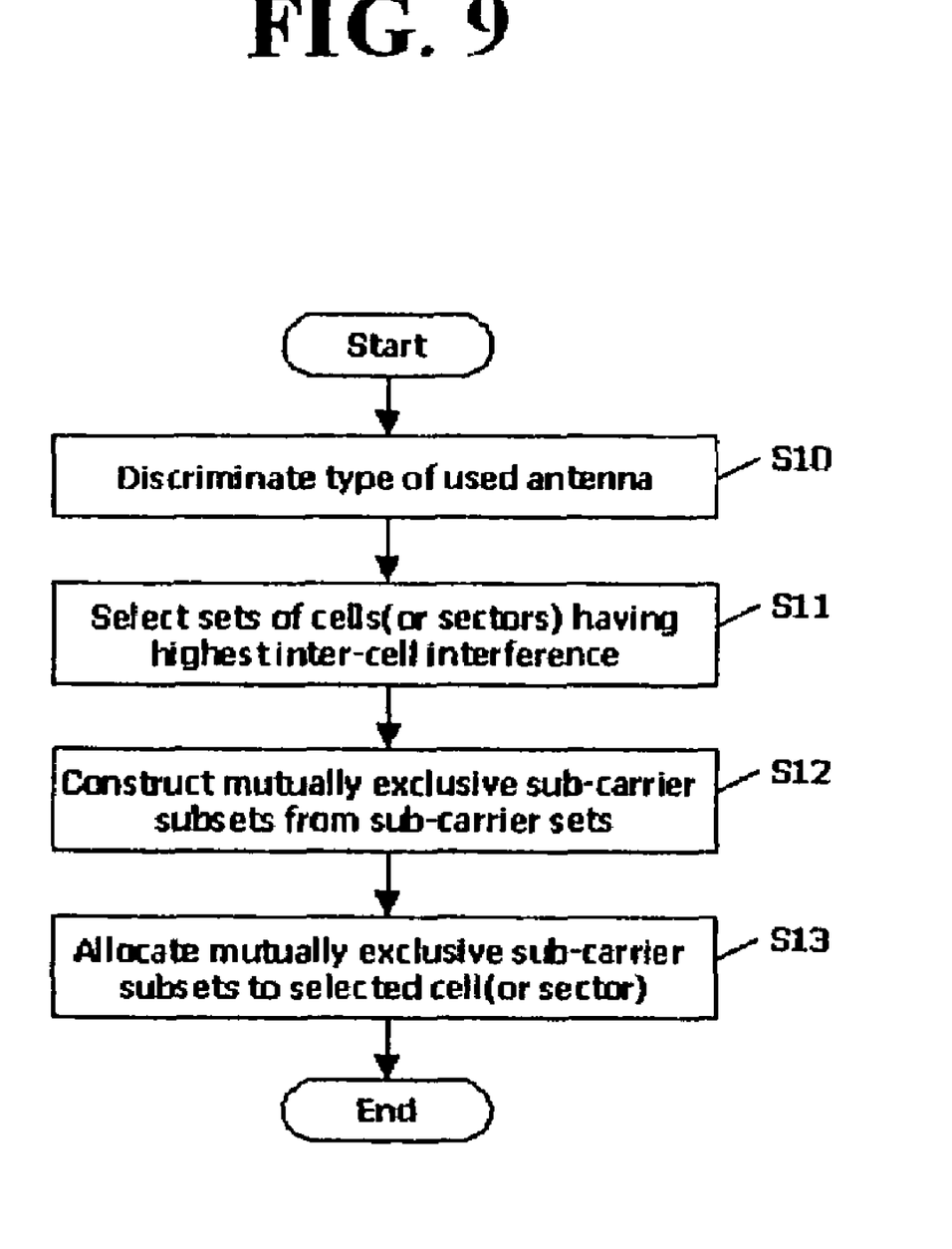
FIG. 9 is a flow chart illustrating the allocation of sub-carriers to each cell in a system.

Turning now the flowchart in FIG. 9, which illustrate a method according to the present invention to prevent sub-carriers transmitting data of neighboring cells from overlapping to thereby reduce inter-cell interference generated in a forward link when OFDM is applied to a multi-cell environment.

When OFDM is applied to a forward link of a mobile communication environment, sub-carriers are allocated to multiple terminals (users) and are multiplexed to provide a user service. Further, the sub-carriers allocated to each terminal (user) are applied with a different transmission power according to a channel state of each sub-carrier. Namely, if a signal is to be transmitted through sub-carriers having a bad channel state, the signal is transmitted with a high power to compensate for the bad channel state. Thus, a certain BER (Bit Error Rate) or an FER (Frame Error Rate), for example, required for a system is maintained to satisfy a QOS (Quality of Service) required for a service.

As shown in FIG. 9, a radio network controller (RNC) using the OFDM determines what type of an antenna is used in the multi-cell structure (step S10) and then selects the target cell and the other cells having the largest interference effect on the target cell (step S11). Once the cells are selected, the RNC determines the different sub-carriers of the overall frequency band to be used (step S12). Further, the sub-carrier subsets are selected so they do not overlap with each other. Sub-carrier subsets are explained below.

First, the omni-directional antenna case in FIG. 3 is considered. In this example, the seven cells including the central cell (referred to as the 'target cell' hereinafter) and the adjacent six cells causing interference to the target cell are considered. In addition, each cell is assumed to use the same frequency band.

Figure 10:
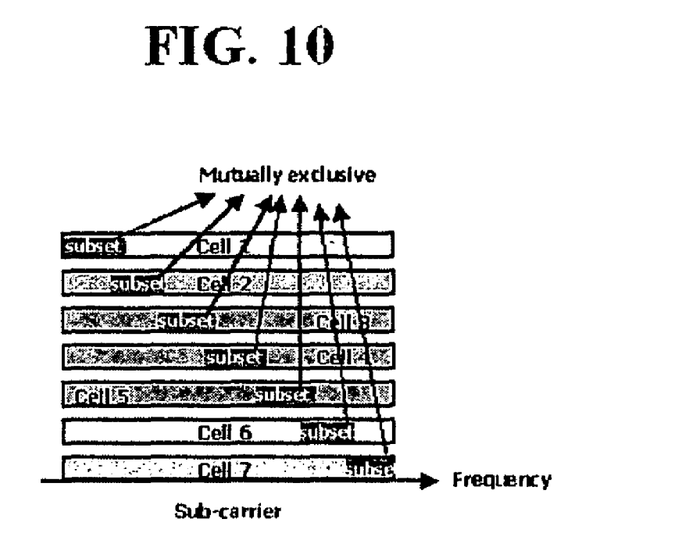
FIG. 10 is an overview illustrating the allocation of mutually exclusive sub-carrier subsets when using the omni-directional antenna.

When using an omni-directional antenna, seven mutually exclusive sub-carrier subsets are selected. FIG. 10 illustrates this concept. That is, as shown in FIG. 10, seven mutually exclusive sub-carrier subsets are selected. Note, however, the mutually exclusive sub-carrier subsets do not have to be selected based on physically adjacent sub-carriers. For example, the sub-carrier subsets for the cell 2 and 3 in FIG. 10, may be switched.

Once the seven sub-carrier subsets are selected, the RNC allocates the seven mutually exclusive sub-carrier subsets to the seven selected cells in turn or arbitrarily (step S13). Namely, the RNC allocates the mutually exclusive sub-carrier subsets among the entire sub-carrier sets to each cell.

Figure 11:
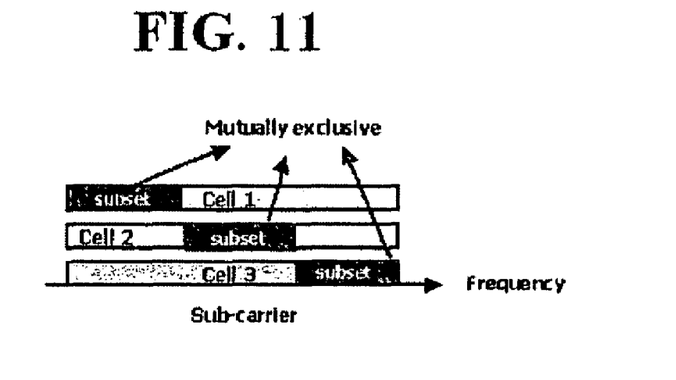
FIG. 11 is an overview illustrating the allocation of mutually exclusive sub-carrier subsets in case of using a 120°-directional antenna.

Next, FIG. 11 illustrates the selection of sub-carrier subsets when a 120°-directional antenna is used. In this example and as shown in FIG. 11, the RNC allocates mutually exclusive sub-carrier subsets to the three sectors such that they do not overlap with each other.

Figure 12:
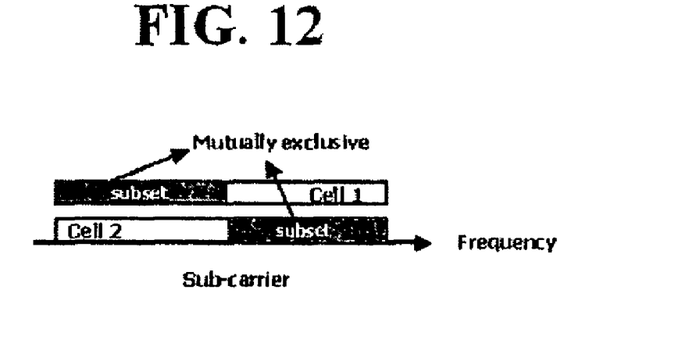
FIG. 12 is an overview illustrating the allocation of mutually exclusive sub-carrier subsets when using a 60°-directional antenna.

FIG. 12 illustrates the selection of sub-carrier subsets when a 60°-directional antenna is used. In this example and as shown in FIG. 12, the RNC allocates mutually exclusive sub-carrier subsets to the two sectors such that they do not overlap with each other.

Figure 13:
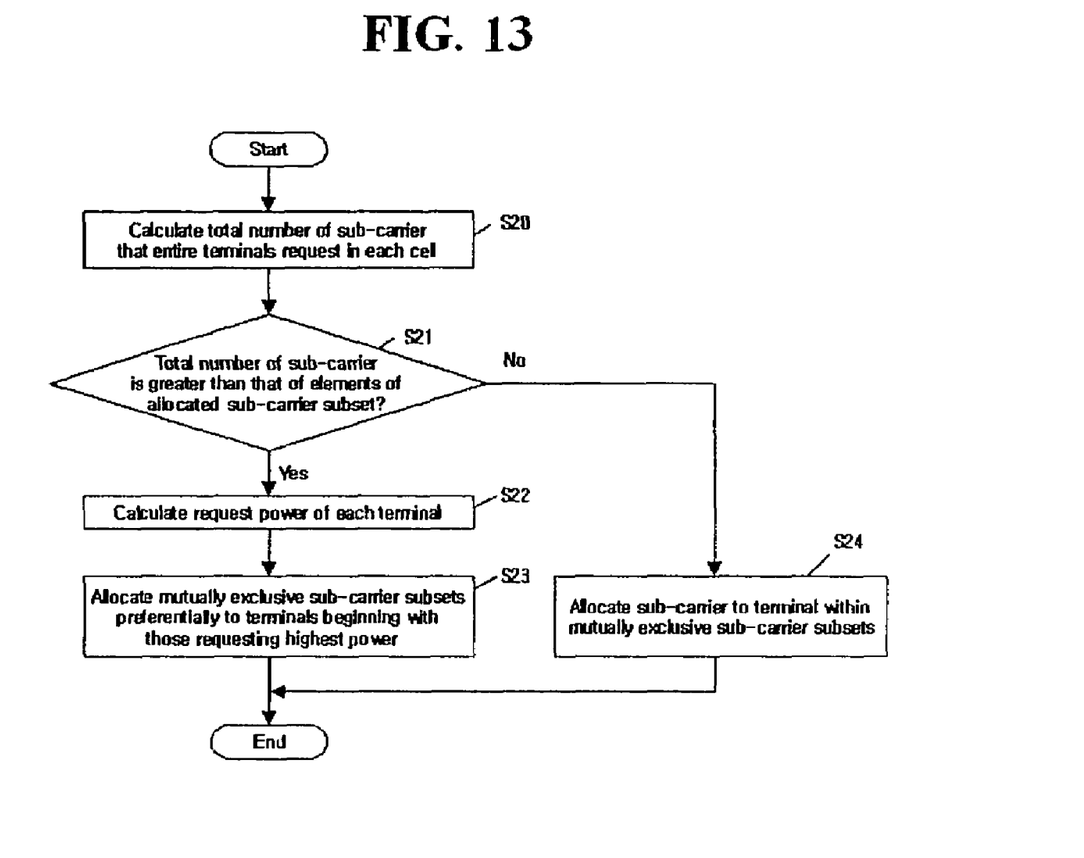
FIG. 13 is a flow chart illustrating a method of allocating sub-carriers subsets for each terminal in each cell.

Turning next to FIG. 13, which is a flowchart illustrating the allocation of sub-carriers subset for each terminal in each cell according to another example of the present invention. In this example, when sub-carrier subsets are allocated to each cell (or sector) by the RNC, the RNC in communication with the base stations of the selected cells determines the total number of sub-carriers required in each cell to serve the requesting users (step S20).

Then, the RNC determines for each cell (or sector) whether or not the total number of sub-carriers needed exceeds the number of elements of the mutually exclusive sub-carrier subsets (step S21). If the total number of requested sub-carriers exceeds the number of the available mutually exclusive sub-carrier subsets (Yes in Step S21), the RNC calculates for each cell (or sector) the transmission power requested by each terminal (step S22), allocates sub-carriers within the mutually exclusive sub-carrier subsets with a preference for terminals requesting a high power, and then allocates sub-carriers other than the sub-carrier subset to other remaining terminals requesting less power (step S23).

Further, in another example, the RNC calculates for each cell (sector) the transmission power that each terminal requests and allocates the mutually exclusive sub-carrier subsets with a preference to terminals beginning with terminals requesting a transmission power greater than a threshold value set for each cell.

If, however, the total number of requested sub-carriers is smaller than the number of elements of the sub-carrier subsets allocated to each cell (or sector) (No in step S21), the RNC allocates mutually exclusive sub-carrier subsets to every terminal within the mutually exclusive sub-carrier subsets (step S24).

Thus, in the example shown in FIG. 13, if the total number of requested sub-carriers exceeds the number of available mutually sub-carrier subsets, the sub-carriers are allocated in consideration of the transmission power requested by each terminal (user) to further remove inter-cell interference. Namely, if a transmission power request value of each terminal exceeds a predetermined threshold value, the terminal is allocated within the mutually exclusive sub-carrier subsets, whereas a terminal having a transmission power request value not exceeding the threshold value is allocated outside the mutually exclusive sub-carrier subsets. Thus, sub-carriers having a high transmission power exceeding the predetermined threshold value do not overlap with each other among cells (sectors). Namely, because sub-carriers requesting a high transmission power do not overlap with each other, the influence of interference is reduced.

For example, consider when a 60° directional antenna is used as shown in FIGS. 7, 8 and 12. In this example, there are two sectors to be considered (e.g., that have the strongest interference effect). In the example of FIG. 9, terminals in sector #1 are assigned sub-carriers in subset #1 and terminals in sector #2 are assigned sub-carriers in subset #2 (see FIG. 12). The subsets #1 and #2 are mutually exclusive. In the example shown in FIG. 13, the total number of sub-carriers requested is first determined. For example, assume that the total number of sub-carriers is 200 and subset #1 corresponding to sector #1 can provide 100 sub-carriers. If, however, 200 sub-carriers are actually requested from terminals in sector #1 (which is Yes in step S13 of FIG. 13), the requested transmission power of each terminal is calculated. Because there are 200 sub-carriers requested, which exceeds the total number of available sub-carriers, 100 sub-carriers within subset #1 are allocated to terminal having a highest transmission power, and the other terminals will be assigned sub-carriers from subset #2, which is not the mutually exclusive sub-carrier subset of sector #1. The same method can be applied to the terminals in sector #2. Thus, the terminals transmitting from sectors #1 and #2 with the highest power (and are thus more likely to cause interference than terminals transmitting with a lower power) will be mutually exclusive and interfere with each other less.

As so far described, the sub-carrier allocation method for reducing an inter-cell interference in an OFDM cellular environment has the following advantages.

Because neighboring cells (or sectors) in a forward link of a cellular OFDM system transmit data by preferentially carrying the data on mutually exclusive sub-carriers, the regions of cells where data transmission sub-carriers overlap are reduced and thus inter-cell interference is reduced.

In addition, mutually exclusive sub-carriers are preferentially allocated to terminals that are positioned near the cell boundaries and thus request a higher transmission power, so that inter-cell interference is reduced.

This invention may be conveniently implemented using a conventional general purpose digital computer or microprocessor programmed according to the teachings of the present specification, as well be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A sub-carrier allocation method, comprising:
    selecting a number of cells having a strongest inter-cell interference among cells in a multiple-cell environment;
    selecting mutually exclusive sub-carrier sets for each cell selected having the strongest interference;
    allocating the selected mutually exclusive sub-carrier subsets to each cell, wherein the allocated sub-carrier sets are applied with a different transmission power according to a channel state of each sub-carrier and the mutually exclusive sub-carrier subsets is transmitted by using at least one of an omni-directional antenna, a 120°-directional antenna and a 60°-directional antenna;
    obtaining a total number of sub-carriers requested by terminals in a cell;
    comparing the obtained total number of sub-carriers with a total number of available sub-carriers in the cell;
    allocating the available sub-carriers of the cell to as many of the terminals in the cell as possible; and
    allocating sub-carriers of the other cell to any remaining terminals that were not allocated in the cell.

2. The method of claim 1, further comprising:
    determining what type of antenna is being used in the multiple-cell environment.

3. The method of claim 1, wherein if the type of antenna used is determined to be an omm-directional antenna, the number of cells selected having the strongest inter-cell interference is seven.

4. The method of claim 1, wherein if the type of antenna used is determined to be a 120°-directional antenna, the number of cells selected having the strongest inter-cell interference is three.

5. The method of claim 1, wherein if the type of antenna used is determined to be a 60°-directional antenna, the number of cells selected having the strongest inter-cell interference is two.

6. The method of claim 1, wherein preferentially allocating the available sub-carriers comprises:
    allocating the available sub-carriers of the cell based on how much transmission power is requested by the terminals, if the total number of requested sub-carriers is greater than the total number of available sub-carriers in the cell.

7. The method of claim 6, wherein allocating the available sub-carriers comprises:
    allocating the available sub-carriers of the cell to terminals requesting a higher transmission power, and allocating the sub-carriers in the other cell to any remaining requesting terminals not allocated sub-carriers in the cell.

8. The method of claim 1, wherein preferentially allocating the available sub-carriers comprises:
    allocating the available sub-carriers of the cell to all of the requesting terminals, if the total number of requested sub-carriers is smaller than the total number of available sub-carriers in the cell.

9. The method of claim 1, wherein allocating the available sub-carriers comprises:
    allocating mutually exclusive sub-carrier subsets to terminals beginning with terminals requesting a transmission power that is greater than a predetermined threshold.

10. The method of claim 1, wherein each cell uses same overall frequency band.

11. The method of claim 1, further comprising:
    obtaining a total number of sub-carriers requested by terminals in a cell; and
    determining whether the obtained total number of sub-carriers exceeds a number of the allocated mutually exclusive sub-carrier subsets.

12. The method of claim 11, wherein if the obtained total number of sub-carriers is greater than the number of the allocated mutually exclusive sub-carrier subsets by the determining step, further comprising:
    calculating a requesting transmission power for each cell by each terminal; and
    allocating mutually exclusive sub-carrier subsets to terminals beginning from the terminal requesting a highest transmission power.

13. The method of claim 11, wherein if the obtained total number of sub-carriers is not greater than the number of the allocated mutually exclusive sub-carrier subsets by the determining step, further comprising:
    allocating mutually exclusive sub-carrier subsets to every terminal within mutually exclusive sub-carrier subsets.

14. A sub-carrier allocation method, comprising:
    preferentially allocating the available sub-carriers of the cell's own sub-carrier subset to as many of the terminals in the cell as possible;
    selecting a number of cells having a strongest inter-cell interference among cells in a multiple-cell environment;
    selecting mutually exclusive sub-carrier sets for each cell selected having the strongest interference;
    allocating the selected mutually exclusive sub-carrier subsets to each cell, wherein the allocated sub-carrier sets are applied with a different transmission power according to a channel state of each sub-carrier and the mutually exclusive sub-carrier subsets is transmitted by using at least one of an omni-directional antenna, a 120°-directional antenna and a 60°-directional antenna;
    allocating the available sub-carriers of the cell based on how much transmission power is requested by the terminals, if the total number of requested sub-carriers is greater than the total number of available sub-carriers in the cell; and allocating the available sub-carriers of the cell to terminals requesting a higher transmission power, and allocating the sub-carriers in the other cell to any remaining requesting terminals not allocated sub-carriers in the cell.

15. The method of claim 14, further comprising:
allocating sub-carriers of a second sub-carrier subset to any remaining terminals that were not preferentially allocated in the cell.

16. The method of claim 14, further comprising:
determining what type of antenna is being used in the multiple-cell environment.

17. The method of claim 14, wherein if the type of antenna used is determined to be an omm-directional antenna, the number of cells selected having the strongest inter-cell interference is seven.

18. The method of claim 14, wherein if the type of antenna used is determined to be a 120°-directional antenna, the number of cells selected having the strongest inter-cell interference is three.

19. The method of claim 14, wherein if the type of antenna used is determined to be a 60°-directional antenna, the number of cells selected having the strongest inter-cell interference is two.

20. The method of claim 14, wherein preferentially allocating the available sub-carriers comprises:
allocating the available sub-carriers of the cell to all of the requesting terminals, if the total number of requested sub-carriers is smaller than the total number of available sub-carriers in the cell.

21. The method of claim 14, wherein preferentially allocating the available sub-carriers comprises:
allocating mutually exclusive sub-carrier subsets to terminals beginning with terminals requesting a transmission power that is greater than a predetermined threshold.

22. The method of claim 14, wherein the selected mutually exclusive sub-carrier subsets are preferentially allocated to terminals which are located near the cell boundaries.

* * * * *